United States Patent
Giesing et al.

(10) Patent No.: US 11,001,735 B2
(45) Date of Patent: May 11, 2021

(54) LOW EMISSION AQUEOUS DISPERSION ADHESIVE

(71) Applicant: SIKA TECHNOLOGY AG, Baar (CH)

(72) Inventors: Yvonne Giesing, Bocholt (DE); Bernd Overkamp, Horstmar (DE); Tobias Benighaus, Münster (DE)

(73) Assignee: SIKA TECHNOLOGY AG, Baar (CH)

( * ) Notice: Subject to any disclaimer, the term of this patent is extended or adjusted under 35 U.S.C. 154(b) by 62 days.

(21) Appl. No.: 16/308,959

(22) PCT Filed: Jul. 14, 2017

(86) PCT No.: PCT/EP2017/067932
§ 371 (c)(1),
(2) Date: Dec. 11, 2018

(87) PCT Pub. No.: WO2018/011424
PCT Pub. Date: Jan. 18, 2018

(65) Prior Publication Data
US 2019/0322913 A1    Oct. 24, 2019

(30) Foreign Application Priority Data
Jul. 14, 2016   (EP) .................................... 16179558

(51) Int. Cl.
| | | |
|---|---|---|
| *C09J 133/08* | (2006.01) | |
| *C08K 3/26* | (2006.01) | |
| *C08K 3/30* | (2006.01) | |
| *C08K 5/17* | (2006.01) | |
| *C08K 5/098* | (2006.01) | |
| *C08K 5/1545* | (2006.01) | |
| *E04F 15/02* | (2006.01) | |

(52) U.S. Cl.
CPC ............... *C09J 133/08* (2013.01); *C08K 3/26* (2013.01); *C08K 3/30* (2013.01); *C08K 5/098* (2013.01); *C08K 5/1545* (2013.01); *C08K 5/17* (2013.01); *C08K 2003/265* (2013.01); *C08K 2003/3045* (2013.01); *C09J 2400/303* (2013.01); *E04F 15/02155* (2013.01)

(58) Field of Classification Search
CPC ................ C08K 2003/3045; C08K 2003/3063
See application file for complete search history.

(56) References Cited

U.S. PATENT DOCUMENTS

| | | | |
|---|---|---|---|
| 5,082,663 A | * | 1/1992 | Konishi ............... A61K 9/7061 424/445 |
| 2001/0000029 A1 | * | 3/2001 | Misumi ................ A61K 8/8147 424/443 |
| 2004/0068042 A1 | * | 4/2004 | Bachon ................. C04B 40/065 524/502 |
| 2005/0113499 A1 | | 5/2005 | Tamcke et al. |
| 2011/0257302 A1 | | 10/2011 | Terrenoire et al. |

FOREIGN PATENT DOCUMENTS

| | | |
|---|---|---|
| AU | 2003 208 838 A1 | 9/2003 |
| CN | 1 633 488 A | 6/2005 |
| DE | 19801892 A1 | 7/1999 |
| EP | 0 490 191 A2 | 6/1992 |
| EP | 0 620 243 A1 | 10/1994 |
| EP | 2 719 735 A1 | 4/2014 |

OTHER PUBLICATIONS

Aug. 21, 2017 International Search Report issued in International Patent Application No. PCT/EP2017/067932.
Aug. 21, 2017 Written Opinion of the International Searching Authority issued in International Patent Application No. PCT/EP2017/067932.
Jun. 29, 2020 Office Action issued in European Patent Application No. 17737305.7.

* cited by examiner

*Primary Examiner* — Wenwen Cai
(74) *Attorney, Agent, or Firm* — Oliff PLC

(57) ABSTRACT

A water-based dispersion adhesive composition and use thereof for bonding floor coverings or for bonding wood floors to substrates. The water-based dispersion adhesive composition includes an aqueous polymer dispersion including water and at least one water-dispersible polymer, at least one calcium ion complexing agent, at least one calcium ion precipitating agent, and at least one calcium-containing filler.

13 Claims, No Drawings

LOW EMISSION AQUEOUS DISPERSION ADHESIVE

TECHNICAL FIELD

The invention relates to aqueous dispersion adhesive and use thereof for bonding floor coverings or for bonding wood floors to substrates.

BACKGROUND OF THE INVENTION

Dispersion adhesives are widely used in the construction industry for bonding substrates using contact bonding, wet-bonding and semi wet-bonding techniques. In contact bonding, the adhesive is applied on the surfaces of the substrates to be bonded, flashed off, after which the substrates are contacted with each other to create an adhesive bond. In semi wet-bonding the adhesive is applied to one of the substrates, dried to a semi-wet state and contacted with the surface of the other substrate. Typically solvent based adhesives are used in contact-bonding whereas water-based dispersion adhesives are mainly used in wet- or semi-wet bonding.

Compared to solvent-based adhesives, water-based adhesives have the advantage related to improved ecology, safety and industrial hygiene. On the other hand, water based adhesives have limited application temperatures due to the high water content and they tend to have higher production costs than solvent based dispersion adhesives. Due to the requirements related to working safety and application temperature, water-based dispersion adhesives are per se suitable for use as adhesive in the installation of floor coverings in interior rooms of buildings. When used for bonding floor coverings, a semi-wet bonding is typically used. In semi-wet bonding, the dispersion adhesive is first applied in their wet-state on the surface of a substrate. After being contacted with air, the water content of the adhesive starts to decrease and after a certain time period the adhesive reaches a semi-wet state. The floor covering is then contacted with the semi-wet adhesive film after which the drying and curing of the adhesive is continued between the floor covering and the substrate. It is typical for the water-based dispersion adhesives that the initial tack (ability to form adhesive bond) of the wet adhesive layer is quite low and that there is a significant increase in the initial tack towards the end of the wet-phase.

There are some particular requirements for the water-based dispersion adhesives used in bonding floor coverings to substrates. It is generally required that the adhesive in its semi-wet state is able to provide sufficient tackiness soon after the floor covering is contacted with the adhesive film. The initial tack is needed to fixate the floor covering to the substrate for the subsequent curing phase, during which a high strength adhesive bond is formed via further drying. Furthermore, since the adhesive is able to provide sufficient initial tack only in the semi-wet-state, it is required that the adhesive is able to wet the backside of the floor covering in the semi-wet state. Otherwise no adhesive bond could be formed between the floor covering and the substrate. The adhesive should also have long enough working time to enable easy installation with the possibility to correct the initial position of the floor covering after it has been contacted with the adhesive film. The term "working time" refers in the present disclosure to the length of the time period during which the adhesive is in semi-wet state and is still able to form an adhesive bond after being contacted with the substrate. A relatively short waiting time is also desirable in order to decrease the total installation time. The term "waiting time" refers in the present disclosure to the length of the wet-phase, i.e. the length of the time period after the adhesive has been applied to the substrate and before it is contacted with the surface of the substrate. Finally, the adhesive should have a fast tack development, which basically enables short waiting times in semi-wet bonding.

Low boiling plasticizers and/or solvents and/or polymers with very low glass transition temperature are typically added to water-based dispersion adhesives to improve the bond strength development and to reduce the waiting time. However, due to the regulations related to emissions of (semi) volatile organic compounds (VOC) the volatile plasticizers cannot be included in dispersion adhesives in many developed markets. State-of-the-art low-VOC water-based dispersion adhesives typically suffer from significantly longer waiting times compared to water-based dispersion adhesives containing volatile plasticizers.

US2005/0113499 A1 discloses a low-emission dispersion adhesive composition comprising an aqueous polymer dispersion comprising water and water-dispersible polymer and a carboxylated tall oil resin colophony. The water-dispersible polymer is obtained by free-radical polymerization of ethylenically unsaturated monomers using an initiator selected from the group of sodium persulfate, potassium persulfate and ammonium persulfate, tert-butyl hydroperoxides, water-soluble azo compounds, and redox initiators, such as $H_2O_2$/ascorbic acid. The adhesive composition can also comprise filler such as a carbonate (especially calcium carbonate), quartz powder, silicates (for example talc, clay, mica), siliceous earth, sulfates such as calcium or barium sulphate or aluminium hydroxide.

There is thus need for water-based dispersion adhesives, which exhibit low emission of volatile organic compounds and which meet the requirements for good bond strength development, short waiting time and long working time, and which are thus suitable for use in bonding floor coverings or wood floors to various substrates.

SUMMARY OF THE INVENTION

The object of the present invention is to provide a low-emission dispersion adhesive composition having fast tack development, long working time, and good storage stability which are comparable to dispersion adhesive compositions containing low boiling solvents and plasticizers.

The adhesive is especially suitable for bonding floor coverings and wood floors to flooring substrates.

It has been surprisingly found that the tack development of a typical low-emission water-based dispersion adhesive composition can be significantly accelerated by including a calcium ion complexing agent and a calcium ion precipitating agent to the adhesive formulation.

It was further found that such water-based dispersion adhesive compositions exhibit a short waiting time and fast tack development even in the absence of low boiling solvents and plasticizers, which makes them especially suitable for bonding floor coverings and wood floors to flooring substrates.

It was also surprisingly found that the low-emission water based dispersion adhesive compositions of the present invention outperform the state-of-the-art water-based dispersion adhesive compositions containing volatile plasticizers owing to the faster tack development.

The main concept of the invention is that the water-based dispersion adhesive composition comprises aqueous polymer dispersion, at least one calcium ion complexing agent, at least one calcium ion precipitating agent and calcium-containing filler.

According to another aspect of the present invention, a method for bonding floor covering to a substrate is provided.

According to still another aspect of the present invention, use of the water-based dispersion adhesive composition for bonding floor coverings to substrates is provided.

DETAILED DESCRIPTION OF THE INVENTION

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "(meth)acrylic" designates methacrylic or acrylic. Accordingly, the term "(meth)acrylate" designates methacrylate or acrylate.

The term "polyacrylate polymer" designates polymers resulting from the free-radical polymerization of two or more (meth)acrylate monomers. Copolymers of the (meth)acrylate monomers and copolymers of (meth)acrylate monomers with other vinyl group containing monomers are also included within the term polyacrylate polymer". The terms "polyacrylate polymer", "polyacrylate" and "acrylate polymer" are used interchangeably.

The term "wet peel strength" designates the resistance to a peel force developed in a time period of five minutes after a layer of adhesive applied on the surface of a first substrate has been contacted with the surface of a second substrate. The wet peel strength depends on the length of the airing time, i.e. how long the layer of adhesive has been dried on the surface of the first substrate before being contacted with the surface of the second substrate, and on the composition of the adhesive. The wet peel strength describes the ability of the adhesive composition to build tack after a defined airing time. An adhesive composition with "fast tack development" exhibits high wet peel strength after relatively short airing time.

The term "shelf life" designates a time period after which a dispersion adhesive composition has substantially coagulated, separated or settled such that it cannot be readily applied to a surface of a substrate as homogeneous, uniform film.

The term "storage stable composition" designates a composition, which has a shelf life of greater than six months when stored at room temperature and at a relative humidity of 50%.

The term "room temperature" designates a temperature of 23° C.

The term "standard pressure" designates an absolute pressure of 1 bar.

The present invention relates in a first aspect of the invention to a water-based dispersion adhesive composition comprising:
a) an aqueous polymer dispersion comprising water and at least one water-dispersible polymer,
b) at least one calcium ion complexing agent,
c) at least one calcium ion precipitating agent, and
d) at least one a calcium-containing filler.

The term "dispersion" refers to a physical state of matter that includes at least two distinct phases, wherein a first phase is distributed in a second phase, with the second phase being a continuous medium. Preferably, the dispersion comprises a solid phase which is dispersed as solid particles in a continuous liquid phase.

The term "aqueous polymer dispersion" refers to a polymer dispersion having water as the main carrier. Preferably, the "aqueous" refers to a 100% water carrier.

Preferably, the dispersion adhesive composition comprises less than 5% by weight, preferably less than 1% by weight, based on the total weight of the dispersion adhesive composition, of volatile organic compounds having a boiling point of less than 300° C. The term 'boiling point' refers in the present document to standard boiling point, i.e. the boiling point at a pressure of 1 bar. The standard boiling point can be determined, for example, with an ebulliometer.

The aqueous polymer dispersion comprises of one or more water-dispersible polymers, preferably free-radically polymerized polymer(s) obtained from ethylenically unsaturated monomers. Preferably, the such polymers contain principal monomers selected from the group consisting of $C_1$-$C_{20}$-alkyl (meth)acrylates, vinyl esters of carboxylic acids containing up to 20 carbon atoms, vinyl aromatic compounds containing up to 20 carbon atoms, ethylenically unsaturated nitriles, vinyl halides, non-aromatic hydrocarbons having at least two conjugated double bonds, or mixtures of these monomers.

Preferably, the water-dispersible polymer contains monomers mentioned above and mixtures thereof in an amount of 60-100%, more preferably 85-100%, most preferably 95-99.8%, based on the weight of the polymer. Preferred $C_1$-$C_{20}$-alkyl (meth)acrylates include (meth)acrylic acid alkyl esters having a $C_1$-$C_{12}$ alkyl radical, such as methyl (meth)acrylate, n-butyl acrylate, ethyl acrylate, and 2-ethylhexyl acrylate. Polymers obtained by polymerisation of mixtures of acrylic acid alkyl esters and (meth)acrylic acid alkyl esters can be mentioned as particularly suitable polymers.

Suitable vinyl esters of carboxylic acids containing up to 20 carbon atoms include, for example, vinyl laurate, vinyl stearate, vinyl propionate, vinyl esters of tertiary saturated monocarboxylic acids, vinyl acetate, and mixtures of two or more thereof.

Suitable vinyl aromatic compounds include, for example, vinyltoluene, α- and p-methylstyrene, α-butylstyrene, 4-n-butylstyrene, 4-n-decylstyrene and styrene. Acrylonitrile and methacrylonitrile are presented as examples of suitable nitriles.

Suitable vinyl halides include, for example ethylenically unsaturated compounds substituted by chlorine, fluorine or bromine, such as vinyl chloride or vinylidene chloride, and mixtures thereof.

For the preparation of suitable water-dispersible polymers there are furthermore suitable non-aromatic hydrocarbons containing from 2 to 8 carbon atoms and at least two olefinic double bonds, such as butadiene, isoprene and chloroprene.

Further monomers that may be present in the water-dispersible polymer in an amount of 0-40% by weight, preferably from 0-20% by weight and most preferably 0.2-10% by weight, are especially $C_1$-$C_{10}$-hydroxyalkyl (meth)acrylates, (meth)acrylamides and derivatives thereof substituted on the nitrogen by $C_1$-$C_4$-alkyl, ethylenically unsaturated carboxylic acids, dicarboxylic acids, their semi-esters and anhydrides, for example (meth)acrylic acid, maleic acid, fumaric acid, maleic acid anhydride, maleic acid and fumaric acid semi-esters and itaconic acid.

Preferably, the at least one water-dispersible polymer has a glass transition temperature ($T_g$), determined with DSC according to ISO 11357 standard, of −60−+10° C., more preferably of −60-0° C., most preferably −50−−10° C.

The term "glass transition temperature" refers to the temperature measured by differential scanning calorimetry (DSC) according to ISO 11357 standard above which temperature a polymer component becomes soft and pliable, and below which it becomes hard and glassy. The measurements can be performed with a Mettler Toledo 822e device at a heating rate of 2° C./min. The $T_g$ values can be determined from the measured DSC curve with the help of the DSC software.

Suitable water-dispersible polymers have a number average molecular weight ($M_n$) in the range of 5,000-200,000 g/mol, preferably 25,000-200,000 g/mol, most preferably 50,000-200,000 g/mol. Suitable water-dispersible polymers have a weight average molecular weight ($M_w$) in the range of 50,000-800,000 g/mol, preferably 100,000-800,000 g/mol, most preferably 150,000-800,000 g/mol.

Preferably, the at least one water-dispersible polymer has a number average molecular weight ($M_n$) of not more than 200,000 g/mol and a weight average molecular weight ($M_w$) of at least 100,000 g/mol.

The number average and weight average molecular weights can be determined by gel permeation chromatography using polystyrene as standard in a polymer solution in tetrahydrofuran.

The water-dispersible polymers/copolymers can be prepared by free-radical polymerization using substance, solution, suspension or emulsion polymerization techniques, which are known to the person skilled in the art. Preferably, the polymer is obtained by solution polymerization with subsequent dispersion in water or, especially, by emulsion polymerization, so that aqueous polymer dispersions are obtained.

According to one or more embodiments of the present invention, the aqueous polymer dispersion comprises one or more polyacrylate polymers. Preferably, the aqueous polymer dispersion is an aqueous polyacrylate dispersion, in which the amount of the other polymers than polyacrylates is less than 5.0% by weight, preferably less than 2.5% by weight, most preferably less than 1.0% by weight, based on the total weight of the aqueous polymer dispersion.

Suitable polyacrylate dispersions and preparation method thereof are described, for example in EP 0490191 A2, DE 19801892 A1, and in EP 0620243, the contents of which are incorporated here by reference.

Suitable polyacrylate polymers consist for the most part of (meth)acrylates of alcohols containing from 1 to 24 carbon atoms ((meth)acrylic acid ester monomers). There are preferably more than 25% by weight of these basic monomer building blocks in the polyacrylate polymers. Further monomer building blocks include, for example, vinyl esters and allyl esters of carboxylic acids containing from 1 to 20 carbon atoms, vinyl ethers of alcohols containing from 1 to 8 carbon atoms, vinyl aromatic compounds, vinyl halides, non-aromatic hydrocarbons containing from 2 to 8 carbon atoms and at least one olefinic double bond, α and β-unsaturated mono- or di-carboxylic acids containing from 3 to 6 carbon atoms, and derivatives thereof (especially amides, esters and salts). The proportions by weight of the monomer building blocks are so selected that the polyacrylate polymer has a glass transition temperature of of −60−+10° C., preferably of −60-0° C., most preferably of −50−−10° C.

Preferably, the at least one polyacrylate polymer has a number average molecular weight ($M_n$) in the range of 5,000-200,000 g/mol, preferably 25,000-200,000 g/mol, most preferably 50,000-200,000 g/mol and/or a weight average molecular weight ($M_w$) in the range of 50,000-800,000 g/mol, preferably 100,000-800,000 g/mol, most preferably 150,000-800,000 g/mol.

Suitable commercially available aqueous polyacrylate dispersions include Arconal® A323, Arconal® A378, Arconal® 380, Arconal® S 559, Arconal® 5047 (from BASF), Airflex® EAF 60, and Airflex® EAF 67 (from APP), Mowilith® DM 1340 (from Clariant), Primal® CA 162, and Primal® CA 172 (from Rohm and Haas).

The aqueous polymer dispersion can comprise two or more different polyacrylate polymers having different glass transition temperatures and different monomer compositions. Aqueous polymer dispersions comprising two or more different polyacrylated polymers can be prepared by mixing commercially available polyacrylate dispersions, such as those described above.

The at least one calcium ion complexing agent is preferably selected from the group consisting of mono saccharides, sugar alcohols derived from mono saccharides, sugar acids derived from mono saccharides and salts thereof, and compounds containing at least two dicarboxy amine groups.

Suitable mono saccharides include trioses, tetroses, pentoses, and hexoses. More specific examples include glucose, galactose, mannose, xylose, erythrose, fructose, glycerose, threose, arabinose, ribose, lyxase, dextrose, levulose, and sorbose. Preferred mono saccharides include glucose, mannose, xylose and erythrose.

Suitable sugar alcohols include xylitol, arabinitol, sorbitol, mannitol, erythritol, galactitol, lactitol, maltitol, isomaltitol, maltotriitol. Preferred sugar alcohols include sorbitol, xylitol and erythritol.

Suitable sugar acids derived from mono saccharides include gluconic acid, ascorbic acid, glyceric acid, xylonic acid, neuraminic acid, ketodeoxyoctulosonic acid, glucuronic acid, galacturonic acid, iduronic acid, tartaric acid, mucic acid, and saccharic acid. Preferred sugar acids include glyceric acid, xylonic acid, gluconic acid, and ascorbic acid.

Suitable salts of the sugar acids include all alkali metal and earth alkaline metal salts of the above disclosed sugar acids. Suitable compounds containing at least two dicarboxy amine groups include ethylenediaminetetraacetic acid (EDTA), diethylenetriaminepentaacetic acid (DTPA), 1,4,7,10-tetraazacyclododecane-N,N',N'',N'''-tetraacetic acid (DOTA), 1,4,7,10-tetraazacyclododecane-N,N',N'''-triacetic acid (DO3A), trans(1,2)-cyclohexano diethylenetriaminepentaacetic acid, and N,N-biscarboxymethylglycine. Other suitable calcium ion complexing agents include nitrilotriacetic acid (NTA), iminodiacetic acid (IDA), and iminotriacetic acid (ITA).

Preferably, the at least one calcium ion complexing agent is selected from the group consisting of alkali metal and earth alkaline metal salts of gluconic acid, and ethylene diamine tetra acetate (EDTA). It has been found that the dispersion adhesive compositions comprising one or more calcium ion complexing agents selected from the aforementioned group exhibit fast tack development and good storage stability.

The at least one calcium ion precipitating agent is preferably selected from the group consisting of alkali and earth alkaline metal sulfates, alkali metal disulfates, and earth alkaline metal disulfates, the salts having a water solubility of at least 1.0 g/100 ml, preferably at least 2.5 g/100 ml, most preferably at least 5.0 g/100 ml, at temperature of 20° C. The solubility of a substance in water can be measured as the saturation concentration, where adding more substance does not increase the concentration of the solution, i.e.

where the excess amount of the substance begins to precipitate. It has been found that water-based dispersion adhesive compositions comprising one or more calcium ion precipitating agents selected from the aforementioned group exhibit fast tack development and good storage stability. It was also found that although phosphate salts are in principle suitable as calcium ion precipitating agents their presence in the adhesive formulation tends to deteriorate, and in some cases destroy, the storage stability of the dispersion adhesive composition.

Preferably, the calcium ion complexing agent is sodium gluconate and the calcium ion precipitating agent is potassium sulfate. It has been found that water based dispersion adhesive compositions containing the aforementioned combination of calcium ion complexing agent and precipitating agent have particularly fast tack development and good storage stability and are, therefore, especially suitable for use as flooring adhesives.

Preferably, the one or more calcium ion complexing agents are present in a total amount of 0.1-5.0% by weight, preferably 0.1-2.5% by weight, most preferably 0.1-1.5% by weight, based on the total weight of the dispersion adhesive composition. Dispersion adhesive composition compositions having the total amount of calcium ion complexing agent below the aforementioned lower limit did not show significant improvements in the rate of tack development. On the other hand, dispersion adhesive compositions having the amount of calcium ion complexing agent above the aforementioned upper limit were found to exhibit insufficient storage stability.

Preferably, the one or more calcium ion precipitating agents are present in a total amount of 0.1-5.0% by weight, preferably 0.1-2.5% by weight, most preferably 0.1-1.5% by weight, based on the total weight of the dispersion adhesive composition. Dispersion adhesive composition compositions having the amount of calcium ion precipitating agent below the aforementioned lower limit did not show significant improvements in the rate of tack development. On the other hand, amount of calcium ion precipitating agents above the aforementioned upper limit were found to exhibit insufficient storage stability.

The type and amount of calcium-containing fillers is not particularly limited in the present invention. Such calcium containing fillers are known to a person skilled in the art. Examples of suitable calcium containing fillers include calcium carbonate, calcium sulfate and calcium containing minerals such as limestone, calcite, chalk, dolomite, wollastonite, gypsum, apatite, phosphate rock, and mixtures thereof.

The term "filler" refers in the present disclosure to solid particulate materials, which are commonly used as fillers in water-based dispersion adhesive compositions and which have low water-solubility. Preferably, the calcium containing filler has a water-solubility of less than 0.5 g/100 g water, more preferably less than 0.25 g/100 g water, most preferably less than 0.1 g/100 g water, at a temperature of 20° C.

Preferably, the calcium containing filler has a median particle size $d_{50}$ in the range of 1.0-100.0 µm, more preferably of 1.0-60.0 µm, most preferably 2.0-50.0 µm.

The term "median particle size $d_{50}$" refers in the present disclosure to a particle size below which 50% of all particles by volume are smaller than the $d_{50}$ value. The term "particle size" refers to the area-equivalent spherical diameter of a particle. The particle size distribution can be measured by laser diffraction according to the method as described in standard ISO 13320:2009. A Mastersizer 2000 device (trademark of Malvern Instruments Ltd, GB) can be used in measuring particle size distribution.

Preferably, the one or more calcium-containing fillers are present in the dispersion adhesive composition in a total amount of 10.0-60.0% by weight, preferably 15.0-50.0% by weight, most preferably 20.0-45.0% by weight, based on the total weight of the dispersion adhesive composition.

According to one or more embodiments, the water content of the dispersion adhesive composition is 10.0-60.0% by weight, preferably 15.0-50.0% by weight, most preferably 20.0-45.0% by weight, based on the total weight of the dispersion adhesive composition.

According to one or more embodiments, the amount of aqueous polymer dispersion is 10.0-70.0% by weight, preferably 15.0-65.0% by weight, most preferably 20.0-60.0% by weight, based on the total weight of the dispersion adhesive composition.

According to one or more embodiments, the dispersion adhesive composition has a solids content of 40-90% by weight, preferably 50-85% by weight, most preferably 55-80% by weight. The solids content as used herein refers to the portion of the aqueous dispersion adhesive composition, which when heated to a temperature of 105° C. for one hour at one atmosphere pressure does not volatilize. Accordingly, the solids content refers to polymeric materials, non-volatile plasticizers, inorganic solids and non-volatile organic materials, whereas the non-solid portion is generally comprised of water and any organic materials readily volatilized at 105° C.

According to one or more embodiments, the aqueous polymer dispersion has a solids content of 20-80% by weight, preferably 30-65% by weight, most preferably 45-60% by weight.

According to one or more embodiments, the water-dispersible polymers are present in the dispersion adhesive composition in a total amount of 5.0-65.0% by weight, preferably 10.0-55.0% by weight, most preferably 15.0-45.0% by weight, based on the total weight of the dispersion adhesive composition.

The dispersion adhesive compositions can further contain one or more plasticizers. Suitable plasticizers are liquid or solid inert organic substances having a low vapor pressure, preferably having a standard boiling point of above 200° C. Plasticizers can be selected from the group consisting of adipic and sebacic acid plasticizers, phosphoric acid plasticizers, citric acid plasticizers, fatty acid esters and epoxidised fatty acid esters, fatty alcohols, polypropylene glycol, polyethylene glycol, benzoates, and phthalates or esters of 1,2-dicarboxy cyclohexane.

Suitable fatty acid esters include alkyl esters of fatty acids containing more than about 14 or more than about 16 carbon atoms, for example the alkyl esters of lauric, myristic, stearic, arachidic and behenic acid and mixtures thereof. Suitable as fatty alcohols are the alcohols of the above-mentioned fatty acids, such as are obtainable from the fatty acids or esters thereof by use of processes known to the person skilled in the art.

The one or more plasticizers can be present in the dispersion adhesive composition in a total amount of 0-30.0% by weight, for example 1.0-20% by weight, in particular 3.0-15.0% by weight, based on the total weight of the dispersion adhesive composition.

The dispersion adhesive composition can further comprise one or more tackifiers. Examples of suitable tackifiers may include hydrocarbon resins or hydrogenated products thereof, rosins or hydrogenated products thereof, rosin esters or hydrogenated products thereof, terpene resins or hydrogenated products thereof, terpene phenolic resins or hydrogenated products thereof, and polymerized rosins or polymerized rosin esters.

The dispersion adhesive composition can also contain one or more further additives such as dispersing agents, thickeners, and anti-foams. Such further additives commonly used in water-based dispersion additives are known to a person skilled in the art.

Suitable anti-foams are preferably compounds based on mineral oils or silicones. Suitable thickeners include compounds that are based on (meth)acrylic acid copolymers or cellulose derivatives or mixtures thereof. Suitable as preservatives are customary preservatives, for example benzisothiazolinone (BIT), methylisothiazolinone (MIT), chloromethyl isothiazolinone (CMIT), and the like.

According to one or more embodiments, the total amount of the further additives is preferably 0-15.0% by weight, more preferably 0-10.0% by weight, based on the total weight of the dispersion adhesive composition.

The dispersion adhesive composition can be prepared by mixing the ingredients together at room temperature. Any suitable mixing apparatus can be used for the preparation of the adhesive composition.

The dispersion adhesive composition is particularly suitable as flooring adhesive for carpets or other floor coverings on various substrates. Examples of floor coverings include PVC coverings (as multilayer coverings or homogeneous coverings), foam material coverings (with or without textile backing), polyester non-woven coverings, rubber coverings, textile coverings (with various backings, for example polyurethane foam, styrene-butadiene foam, secondary textile backing etc.), needle felt floor coverings, polyolefin coverings, and linoleum coverings.

The dispersion adhesive composition is especially suitable for bonding the aforementioned floor coverings to substrates of wood, plastic or metal, especially mineral substrates such as plaster flooring, concrete, cementitious levelling compounds or gypsum-based levelling compounds.

According to another aspect of the present invention, a method for bonding a floor covering to a substrate is provided. The method comprises steps of:
i) applying water-based dispersion adhesive composition according to the present invention to a surface of the substrate and/or to a surface of the floor covering to form a wet film(s) of the adhesive composition,
ii) exposing the wet film(s) of the adhesive composition to air,
iii) contacting the film of the adhesive composition on the surface of the substrate with the surface of the floor covering or contacting the film of the adhesive composition on the surface of the substrate with the film of the adhesive composition on the surface of the floor covering or contacting the film of the adhesive on the surface of the floor covering with the surface of the substrate, to effect bonding there between.

The dispersion adhesive composition can be applied on the surface of the substrate and/or the floor covering using for example, a toothed trowel or a roller. After customary airing, the floor covering is applied on the surface of the substrate.

According to another aspect of the present invention, use of the water-based dispersion adhesive composition of the present invention for bonding a floor covering to a substrate is provided.

According to still another aspect of the present invention, use of an additive comprising
a) at least one calcium ion complexing agent selected from the group consisting of mono saccharides, sugar alcohols derived from mono saccharides, sugar acids derived from mono saccharides and salts thereof, and compounds containing at least two dicarboxy amine groups,
b) at least one calcium ion precipitating agent selected from the group consisting of alkali and earth alkaline metal sulfates, alkali metal disulfates, and earth alkaline metal disulfates, having a water solubility of at least 1.0 g/100 ml, preferably at least 2.5 g/100 ml, most preferably at least 5.0 g/100 ml, at temperature of 20° C.,
for accelerating the tack development of a water-based dispersion adhesive composition comprising at least one polyacrylate polymer and at least one calcium containing filler.

The polyacrylate polymers are preferably present in the water-based dispersion adhesive in a total amount of 5.0-65.0% by weight, preferably 15.0-45.0% by weight, and/or the calcium containing fillers are preferably present in the water-based dispersion adhesive in a total amount of 10.0-60.0% by weight, preferably 20.0-45.0% by weight, said proportions being based on the total weight of the dispersion adhesive composition.

According to one or more embodiments, the at least one calcium ion complexing agent is present in the water-based dispersion adhesive composition in an amount of 0.1-5.0% by weight, preferably 0.1-2.5% by weight, most preferably 0.1-1.5% by weight, based on the total weight of the dispersion adhesive composition and/or the at least one calcium ion precipitating agent is present in the water-based dispersion adhesive composition in an amount of 0.1-5.0% by weight, preferably 0.1-2.5% by weight, most preferably 0.1-1.5% by weight, based on the total weight of the dispersion adhesive composition.

Preferably, the at least one calcium ion complexing agent is selected from the group consisting of alkali metal and earth alkaline metal salts of gluconic acid, and ethylene diamine tetra acetate (EDTA).

Examples

The followings compounds and products, respectively, were used in the examples:

TABLE 1

| | | |
|---|---|---|
| Acronal ® S 559 | Styrene acrylate dispersion | BASF |
| Acronal ® 5047 | Soft acrylic dispersion | BASF |
| Dispex ® AA 4135 | Dispersing agent | BASF |
| Agitan ® 218 | Defoamer | Münzing Chemie |
| Berol ® 048 | Non-ionic wetting agent | Akzo Nobel |
| Proviplast ® 0142 | Apidic acid ester | Proviron |
| Ecroflow ® AV 25 | Acrylic thickener | Ecronova Polymer |
| NaOH | Sodium hydroxide, 10% water-based solution | H. Möller GmbH & Co. KG |

TABLE 1-continued

| | | |
|---|---|---|
| CaCO3-filler 1 | Calcium carbonate, $D_{50}$ = 6 μm | Eduard Merkle |
| CaCO3-filler 2 | Calcium carbonate, $D_{50}$ = 40 μm | Alpha-Calcit |
| Bremasin ® 1605 | Ethylene glycol rosin ester | Kreamer |
| YT 102 | Gum rosin | Yser SA |
| Plasticizer | Butylglycol diacetate | Stockmeier Chemie GmbH |
| Acticide ® MBS | Biocide | Thor |
| $K_2SO4$ | Dipotassium sulfate | CAS Nr. 7778-80-5 |
| $Na_2SO4$ | Disodium sulfate | CAS Nr. 7757-82-6 |
| MgSO4 | Magnesium sulfate | CAS Nr. 7487-88-9 |
| Na gluconate | Sodium gluconate | CAS Nr. 527-07-1 |
| K gluconate | Potassium gluconate | CAS Nr. 299-27-4 |
| Gluconic acid | Gluconic acid | CAS Nr. 526-95-4 |
| Erythritol | Erythritol | CAS Nr. 10030-58-7 |
| $K_2HPO4$ | Potassium hydrogenphosphate | CAS Nr. 7783-28-0 |
| EDTA-$Na_2$ | Ethylenediaminetetraacetic acid disodium salt dihydrate | CAS Nr. 6381-92-6 |

Preparation of the Adhesive Compositions

The adhesive compositions were prepared by mixing the ingredients as presented in Table 2.

The compositions were mixed by introducing Acronal 5047, Acronal S559 and water in a mixing vessel. Then the additives (Dispex AA 4135, Agitan 218, Berol 048, Proviplast 0142 and Ecroflow AV 25) were added while stirring moderately. The Ca-ion precipitating agents ($K_2SO_4$, $Na_2SO_4$, $MgSO_4$) and complexing agents (Na gluconate, K gluconate, gluconic acid, erythritol, $K_2HPO_4$, Na EDTA) were added to the mixture just after the additives under moderate stirring. The mixture was stirred until homogeneity was achieved followed by addition of NaOH to the mixture after which the mixture was further stirred. Then the calcium carbonate fillers were added to the mixture under powerful stirring until homogeneity was achieved. Afterwards, the resin (Bremasin 1605 or YT 102 in plasticizer) was added to the mixture under stirring. YT 102 was added to the mixture as a "resin melt" of YT 102 and plasticizer that had been mixed separately before adding the resin melt to the mixture. Finally Acticide MBS was added to the mixture and the mixture was stirred until homogeneity was achieved.

Wet Peel Strength

The wet peel strengths of exemplary and reference adhesive compositions obtained with different airing times were determined by measuring average peel resistance upon peeling PVC-strips bonded to wood particle board with the adhesive compositions.

For the peel resistance measurement, adhesive composition was first applied with a suitable notched trowel on a sheet of wood particle board. The thickness of the applied adhesive layer was approximately 250 g/m². After pre-defined airing time of 10, 20, and 30 minutes, PVC strips having dimensions of 5 cm (width)×20 cm (length)×2 mm (thickness) were contacted with the surface of the adhesive layer and pressed against the adhesive layer with a standardized 2 kg roller (according to DIN EN 1372The adhesive layer was allowed to set for 5 minutes before measuring the peel strength.

The average peel resistance was then measured with a spring scale during manual peeling of PVC strips from the surface of the wood particle board at a peeling angle of 90°. The peeling of the PVC strip was continued until the strip was completely detached from the wood particle board. The representative wet peel strength was calculated as peel force per unit width of the PVC strip [N/50 mm] based on the peel resistance measured when half of the PVC strip was peeled off.

The wet peel strength values obtained with the exemplary and reference adhesive compositions presented in Table 2 have been calculated as an average of wet peel strength values obtained with five PVC-strips that were bonded with the same adhesive composition to the wood particle board.

VOC Content

The VOC content of the adhesive compositions was determined according to EN 13999-1 standard.

TABLE 2

Wet peel strengths of adhesive compositions (*airing time)

| Ingredients (wt.-%) | Ref 1 | Ref 2 | Ref 3 | Ref 4 | Ref 5 | Ex 1 | Ex 2 | Ex 3 | Ex 4 |
|---|---|---|---|---|---|---|---|---|---|
| Acronal S 559 | | 5.0 | | | | | | | |
| Acronal 5047 | 43.3 | 30.5 | 42.9 | 42.9 | 42.9 | 42.4 | 42.4 | 42.4 | 42.4 |
| Dispex AA 4135 | 0.5 | 0.5 | 0.5 | 0.5 | 0.5 | 0.5 | 0.5 | 0.5 | 0.5 |
| Agitan 218 | 0.2 | 0.2 | 0.2 | 0.2 | 0.2 | 0.2 | 0.2 | 0.2 | 0.2 |
| Berol 048 | | 0.2 | 0.0 | 0.0 | 0.0 | 0.0 | 0.0 | 0.0 | 0.0 |
| Proviplast 0142 | 6.1 | | 6.0 | 6.0 | 6.0 | 6.0 | 6.0 | 6.0 | 6.0 |
| Ecroflow AV 25 | 0.8 | 0.2 | 0.8 | 0.8 | 0.8 | 0.8 | 0.8 | 0.8 | 0.8 |
| NaOH | 0.1 | 1.8 | 0.1 | 0.1 | 0.1 | 0.1 | 0.1 | 0.1 | 0.1 |
| CaCO3-filler 1 | 17.6 | 15.0 | 17.4 | 17.4 | 17.4 | 17.2 | 17.2 | 17.2 | 17.2 |
| CaCO3-filler 2 | 14.9 | 14.0 | 14.8 | 14.8 | 14.8 | 14.6 | 14.6 | 14.6 | 14.6 |
| Bremasin 1605 | 14.3 | 5.0 | 14.2 | 14.2 | 14.2 | 14.0 | 14.0 | 14.0 | 14.0 |
| YT 102 | | 18.8 | 0.0 | 0.0 | 0.0 | 0.0 | 0.0 | 0.0 | 0.0 |
| Plasticizer | | 6.3 | 0.0 | 0.0 | 0.0 | 0.0 | 0.0 | 0.0 | 0.0 |
| Acticide MBS | 0.2 | 0.2 | 0.2 | 0.2 | 0.2 | 0.2 | 0.2 | 0.2 | 0.2 |
| Water | 2.0 | 2.5 | 2.0 | 2.0 | 2.0 | 2.0 | 2.5 | 2.0 | 2.0 |
| $K_2SO_4$ | | | | | | 1.0 | 1.0 | 1.0 | |

TABLE 2-continued

Wet peel strengths of adhesive compositions (*airing time)

| Ingredients (wt.-%) | Ref 1 | Ref 2 | Ref 3 | Ref 4 | Ref 5 | Ex 1 | Ex 2 | Ex 3 | Ex 4 |
|---|---|---|---|---|---|---|---|---|---|
| $Na_2SO_4$ | | | | | | | | 1.0 | |
| $MgSO_4$ | | | | | | | | | 1.0 |
| Na gluconate | | | | | | | | 1.0 | 1.0 |
| K gluconate | | | 1.0 | | | 1.0 | | | |
| Gluconic acid | | | | | | | 0.5 | | |
| Erythritol | | | | | | | | | |
| $K_2HPO_4$ | | | | | | | | | |
| EDTA-$Na_2$ | | | 1.0 | | | | | | |
| Wet peel strength, [N/50 mm] (10 min)* | 1.0 | 3.0 | 1.0 | 1.0 | 1.0 | 2.0 | 1.0 | 2.0 | 1.0 |
| Wet peel strength [N/50 mm] (20 min)* | 1.0 | 16.0 | 5.0 | 5.0 | 11.0 | 11.0 | 12.0 | 15.0 | 11.0 |
| Wet peel strength [N/50 mm] (30 min)* | 3.0 | 38.0 | 14.0 | 15.0 | 12.0 | 18.0 | 18.0 | 20.0 | 15.0 |
| SVOC/VOC content [wt.-%] | <0.1 | 6.25 | <0.1 | <0.1 | <0.1 | <0.1 | <0.1 | <0.1 | <0.1 |

The invention claimed is:

1. A water-based dispersion adhesive composition comprising:
   a) an aqueous polymer dispersion comprising water and at least one water-dispersible polymer,
   b) at least one calcium ion complexing agent,
   c) at least one calcium ion precipitating agent, and
   d) at least one calcium-containing filler; wherein
   the total amount of the at least one calcium ion precipitating agent is 0.1-5.0% by weight based on the total weight of the dispersion adhesive composition,
   the at least one calcium ion precipitating agent is selected from the group consisting of alkali metal sulfates, alkaline earth metal sulfates, alkali metal disulfates, and earth alkaline metal disulfates, having a water solubility of at least 1.0 g/100 ml at temperature of 20° C.,
   the at least one water-dispersible polymer has a glass transition temperature, determined with DSC according to ISO 11357 standard, of −60−+10° C., and
   the total amount of the at least one calcium ion complexing agent is 0.1-5.0% by weight based on the total weight of the dispersion adhesive composition.

2. The dispersion adhesive composition according to claim 1 comprising less than 5% by weight based on the total weight of the dispersion adhesive composition, of volatile organic compounds having a standard boiling point of less than 300° C.

3. The dispersion adhesive composition according to claim 1, wherein said at least one water-dispersible polymer is polyacrylate polymer.

4. The dispersion adhesive composition according to claim 1, wherein the at least one calcium ion complexing agent is selected from the group consisting of mono saccharides, sugar alcohols derived from mono saccharides, sugar acids derived from mono saccharides, salts of sugar acids derived from mono saccharides, and compounds containing at least two dicarboxy amine groups.

5. The dispersion adhesive composition according to claim 1, wherein the at least ne calcium ion complexing agent is sodium gluconate and the at least one calcium ion precipitating agent is potassium sulfate.

6. The dispersion adhesive composition according to claim 1, wherein the at least one calcium-containing filler is calcium carbonate and the amount of the filler is 10.0-60.0% by weight based on the total weight of the dispersion adhesive composition.

7. The dispersion adhesive composition according to claim 1, wherein the total amount of the at least one water-dispersible polymer is 5.0-65.0% by weight based on the total weight of the dispersion adhesive composition.

8. The dispersion adhesive composition according to claim 1, wherein the at least one calcium ion complexing agent is selected from the group consisting of alkali metal salts of gluconic acid, alkaline earth metal salts of gluconic acid, and ethylene diamine tetra acetate (EDTA).

9. A water-based dispersion adhesive composition comprising:
   a) an aqueous polymer dispersion comprising water and at least one water-dispersible polymer,
   b) at least one calcium ion complexing agent,
   c) at least one calcium ion precipitating agent, and
   d) at least one calcium-containing filler; wherein
   the at least one calcium ion precipitating agent has a water solubility of at least 1.0 g/100 ml at temperature of 20° C., and
   the at least one calcium ion complexing agent is selected from the group consisting of alkali metal salts of gluconic acid, alkaline earth metal salts of gluconic acid, alkali metal salts of glyceric acid, alkaline earth metal salts glyceric acid, alkali metal salts of xylonic acid, alkaline earth metal salts xylonic acid, and ethylene diamine tetra acetate (EDTA).

10. The dispersion adhesive composition according to claim 9, wherein the at least one water-dispersible polymer has a glass transition temperature, determined with DSC according to ISO 11357 standard, of −60−+10° C.

11. The dispersion adhesive composition according to claim 6, wherein the total amount of the at least one calcium ion complexing agent is 0.1-5.0% by weight based on the total weight of the dispersion adhesive composition.

12. A method for bonding a floor covering to a substrate, the method comprising steps of:
   i) applying the water-based dispersion adhesive composition according to claim 1 to a surface of the substrate and/or to a surface of the floor covering to form a wet film(s) of the adhesive composition,
   ii) exposing the wet film(s) of the adhesive composition to air,
   iii) contacting the film of the adhesive composition on the surface of the substrate with the surface of the floor covering or contacting the film of the adhesive composition on the surface of the substrate with the film of the adhesive composition on the surface of the floor covering or contacting the film of the adhesive on the surface of the floor covering with the surface of the substrate, to effect bonding there between.

13. A method for preparing the water-based dispersion adhesive composition according to claim 1, the method comprising mixing
- a) an aqueous polymer dispersion comprising water and at least one water-dispersible polymer,
- b) at least one calcium ion complexing agent,
- c) at least one calcium ion precipitating agent, and
- d) at least one calcium-containing filler; wherein the total amount of the at least one calcium ion precipitating agent is 0.1-5.0% by weight based on the total weight of the dispersion adhesive composition, the at least one calcium ion precipitating agent is selected from the group consisting of alkali metal sulfates, alkaline earth metal sulfates, alkali metal disulfates, and earth alkaline metal disulfates, having a water solubility of at least 1.0 g/100 ml at temperature of 20° C., the at least one water-dispersible polymer has a glass transition temperature, determined with DSC according to ISO 11357 standard, of −60 −+10° C., and the total amount of the at least one calcium ion complexing agent agent(s) is 0.1-5.0% by weight based on the total weight of the dispersion adhesive composition.

* * * * *